June 24, 1930.  W. S. CRATER  1,765,366
DERMATOLOGICAL INSTRUMENT
Filed June 27, 1928

Inventor
WILLARD S. CRATER
By
his Attorneys

Patented June 24, 1930

1,765,366

UNITED STATES PATENT OFFICE

WILLARD S. CRATER, OF COLUMBUS, OHIO

DERMATOLOGICAL INSTRUMENT

Application filed June 27, 1928. Serial No. 288,675.

This invention relates to a dermatological instrument adapted for removing black heads, ingrowing hairs or other objects developing upon the skin.

The purpose of the invention is to provide an improved, simplified and compact device of the kind stated to facilitate the exposing and removing the objects referred to.

The invention is embodied in the example herein shown and described, the features of novelty being finally claimed.

In the accompanying drawing—

Figure 1:
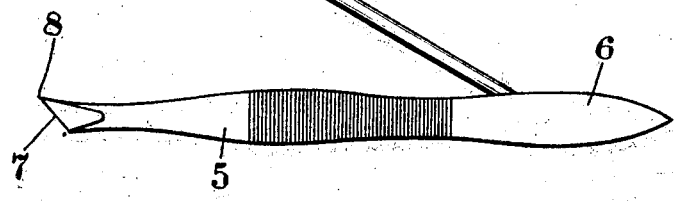
Figure 1 is a view of the invention in side elevation with the magnifying glass at one side of the instrument.
Figure 2:
Fig. 2 is a similar view showing the magnifying glass at the opposite side of the instrument.

Generally the two arms 5, 5, of the tweezers are symmetrical duplicates of spring metal welded together—on, say the line IV—at a handling portion 6. The arms 5, 5, at their free terminals are each made slanting to the axis of the arm so as to present a rather long clamping or pressing edge 7 terminating in a sharp point at 8. The edges 7 can be presented to and pressed upon the skin at opposite sides of a black head, pimple or boil to squeeze out the offending material, and the instrument can be turned over and a point 7 applied to first lift out the end of an ingrowing hair and the tweezers closed together upon the hair to pluck it from the skin.

Each of the described operations is facilitated by means of a magnifying glass 9 preferably mounted at one end of a shank 10 by means of a screw thread. Said shank 10 having at its other end a hinging eye 11 through which a pivoting pin 12 is passed into two ears 13 formed on the handle portion and extending therefrom into the space between the tweezer arms. Because the ears 13 are spaced from the more resilient portions of the tweezer arms the pivoted bearing of the glass shank 10 is not disturbed by the operation of the tweezer arms and said pivoted bearing can be sufficiently tight to hold the glass by friction in the position to which it may be adjusted.

The ears 13 can be provided with abutments 14, 14$^a$, and the nearby end of the shank 10 with lateral projections 15, 15$^a$, to contact with said abutments 14 and 14$^a$, respectively to limit the swing of the glass to its best magnifying position.

Figure 3:
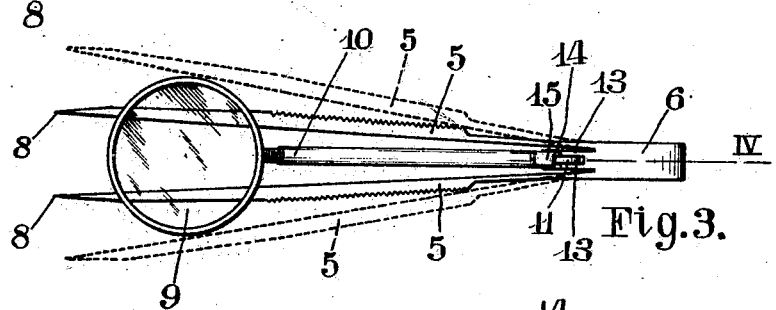
Fig. 3 is a plan view looking edgewise at the arms of the tweezers, showing in broken lines how said arms can be spread to permit reversing the relation of the glass to said arms.
Figure 4:
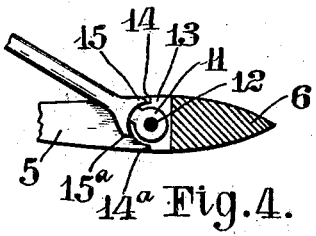
Fig. 4 is a sectional detail on the line IV Fig. 3.

To reverse the relation of the magnifying glass to the operating terminal of the tweezer arms the said arms are spread apart as shown by broken lines Fig. 3, whereupon the glass can be swung to the opposite side between them.

When not in use the magnifying glass can be swung down against the pair of tweezer arms and the instrument thus compacted put into a small box or tray.

The instrument can be used for other purposes and the forms of the parts can be changed without departing from the gist of the invention claimed.

What I claim is:

1. In an instrument of the class described including a pair of spring tweezer arms joined together at one end in fixed relation to each other and having their operating ends symmetrically slanted longitudinally and pointed for diverse dermatological operations by reversing the position of the instrument with respect to the skin to be treated, a magnifying glass having a shank pivotally mounted near the junction of said tweezer arms said glass adapted to be swung between said tweezer arms and to stand projected at opposite sides of the instrument whereby observation can be made through said glass of the operation of the instrument in either of said positions.

2. In an instrument of the class described including a pair of spring tweezer arms joined together at one end in fixed relation to each other and having their operating end symmetrically slanted longitudinally and pointed for diverse dermatological operations by reversing the position of the instrument with respect to the skin to be treated, a magnifying glass having a shank pivotally mounted near the junction of said tweezer arms, said glass adapted to be swung between said tweezer arms and to stand projected at opposite sides of the instrument whereby observation can be made through said glass of the operation of the instrument in either of said positions and means for limiting the swing of said glass to a given focusing position.

WILLARD S. CRATER.